Jan. 4, 1927.
G. J. ZETHMAYR
1,612,897
THERMOCOUPLE
Filed March 17, 1926
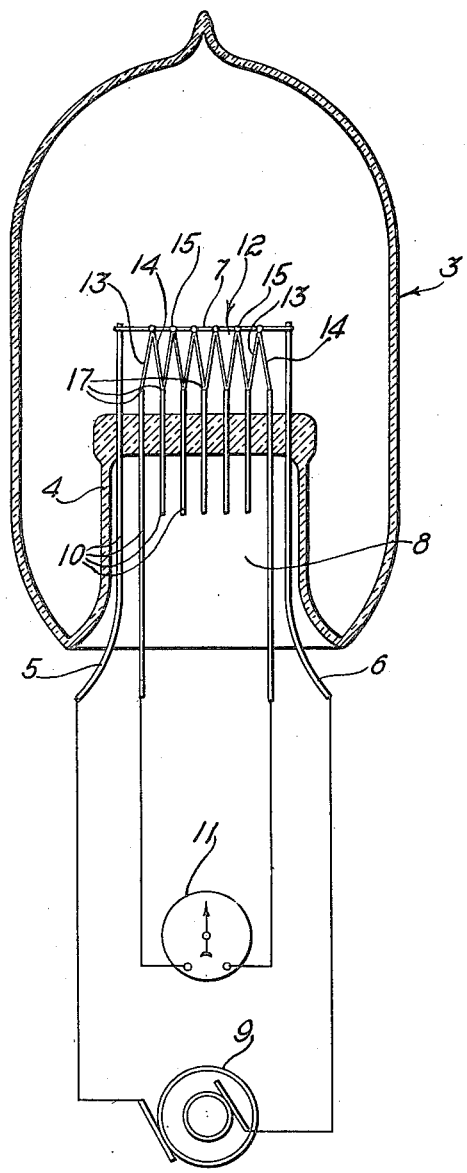
Inventor
Gordon J Zethmayr
by [signature]
Att'y.

Patented Jan. 4, 1927.

1,612,897

UNITED STATES PATENT OFFICE.

GORDON JOHN ZETHMAYR, OF CONGRESS PARK, ILLINOIS, ASSIGNOR TO WESTERN ELECTRIC COMPANY, INCORPORATED, OF NEW YORK, N. Y., A CORPORATION OF NEW YORK.

THERMOCOUPLE.

Application filed March 17, 1926. Serial No. 95,426.

This invention relates to thermocouples, and more particularly to multiple vacuum thermocouples especially adapted for measuring alternating currents of high frequency, and has for its primary object to provide an improved and efficient thermocouple of the hereinbefore mentioned type.

In accordance with one embodiment of this invention, a plurality of serially connected thermocouple filaments are vacuum sealed within a single bulb in thermal connection with a common current carrying heater element but electrically insulated therefrom.

Specifically there is provided a multiple thermocouple comprising a vacuum sealed glass bulb, supporting therein a single heater element thermally connected to but electrically insulated from a plurality of serially connected individual filaments by employing small beads of electrical insulating refractory composition at the thermo or hot junctions, the input leads to the heater element and the output leads from the thermocouple filaments being sealed into the stem of the bulb with their outer ends connected to a source of electrical current and a galvanometer, respectively. The cold junctions of the thermocouple filaments are connected to relatively heavy wires of heat conducting material, which are sealed into the stem of the bulb but extend therefrom and into the surrounding atmosphere to maintain the latter connections at substantially atmospheric temperature.

Other objects and advantages of this invention will more fully appear from the following detailed description taken in connection with the accompanying drawing illustrating diagrammatically the preferred embodiment of the improved vacuum thermocouple as used in measuring, in a well known manner, alternating currents of high frequency.

Referring to the drawing, the numeral 3 indicates a vacuum sealed glass tube or bulb enclosing a glass stem 4 upon which the interior parts are supported. Sealed into the stem 4 are input leads 5 and 6 composed of platinum or other suitable metal for sealing to glass and supporting at their upper or inner ends a heating filament 7, the ends of the heater element being welded or otherwise connected to the leads 5 and 6. The lower or outer ends of the leads 5 and 6 extend suitably from the stem 4, and as diagrammatically illustrated in the drawing are connected when the thermocouple is to be used for measuring, as hereinbefore mentioned, to an alternating current source indicated at 9. Also sealed in the stem 4 is a plurality of leads 10 composed of relatively heavy wires suitable for sealing to glass and of heat conducting material. The leads 10 project a short distance above the top surface of the stem 4, and are equally spaced one from the other and disposed in vertical and horizontal alinement directly below the heater element 7. The outermost leads 10 are shown in the measuring circuit, as connected to a galvanometer indicated at 11. A plurality of individual filamentary thermocouples 12 comprising wires 13 and 14 of suitable diameter and consisting respectively of dissimilar metals, such as iron and advance or constantan wire or other suitable metals, are connected as indicated at 15 with the heater element 7 and at which junction a thermo-electric effect is obtained. The junction 15 is commonly termed the "hot junction." The wires 13 and 14 are welded or otherwise connected as indicated at 17 to the upper or inner ends of the leads 10, which point of connection is commonly called the "cold junction." Each of the junctions 15 of the filamentary thermocouples 12 is supported upon the common heater element 7 by an electrical insulating refractory composition applied in plastic form in the shape of globules which may be baked to cause hardening or solidification thereof or allowed to harden in the atmosphere, care being taken that the adjacent surfaces of the element 7 and the thermocouple 12 do not actually engage but are spaced apart by the refractory composition, whereby the heater element 7 is thermally connected to but electrically insulated from each individual thermocouple 12. A commercial or trade preparation found suitable for this purpose is termed "Insalute." The use of beads of electrical insulating composition at the hot junctions 15, in addition to forming a thermal connection between the heater element 7 and the thermocouple 12, simplifies the support of the filamentary thermocouples as will readily be apparent.

What is claimed is:

1. In a thermocouple, a filamentary thermocouple unit, a heating filament, and a refractory body forming a thermal connection between the unit and the heating filament but electrically insulating the same.

2. In a thermocouple, a vacuum bulb, a plurality of filamentary thermocouple units enclosed therein, and a filament adapted to be heated thermally connected to but electrically insulated from said thermocouples by a refractory composition.

3. In a thermocouple, a vacuum bulb, a plurality of serially connected filamentary thermocouples enclosed therein, and a filament adapted to be heated positioned adjacent the thermal junctions of said thermocouples and thermally connected to but electrically insulated from said thermocouples by a refractory composition.

4. In a thermocouple, a vacuum bulb, a plurality of filamentary thermocouples enclosed therein, a filament adapted to be heated positioned adjacent the thermal junctions of said thermocouples and thermally connected to but electrically insulated therefrom by a refractory composition, and leads extending from said thermocouples and externally of said bulb.

5. In a thermocouple, a vacuum bulb, a plurality of filamentary thermocouples enclosed therein, a filamentary heater spaced from and extending across the thermal junctions of said thermocouples and thermally connected to but electrically insulated therefrom by a refractory composition applied at the junctions, and means for supporting said heater within said bulb and conducting heat thereto.

6. In a thermocouple, a vacuum bulb, a plurality of serially connected filamentary thermocouples enclosed therein, a filamentary heater adjacent the thermal junctions of said thermocouples and thermally connected to but electrically insulated therefrom by a refractory composition, leads extending from said thermocouple and externally of said bulb, and means for supporting said heater within said bulb and conducting heat thereto.

7. In a thermocouple, a vacuum bulb, a plurality of filamentary thermocouples enclosed therein, a filamentary heater spaced from and extending across the thermal junctions of said thermocouples and thermally connected to but electrically insulated therefrom by a refractory composition applied at the junctions, leads extending from said thermocouple and externally of said bulb, and means for supporting said heater within said bulb and conducting heat thereto.

In witness whereof, I hereunto subscribe my name this 25th day of Feb. A. D., 1926.

GORDON JOHN ZETHMAYR.